(No Model.)

R. S. MATTESON.
ORNAMENTAL CHAIN.

No. 318,997. Patented June 2, 1885.

WITNESSES

INVENTOR

United States Patent Office.

RUFUS S. MATTESON, OF PROVIDENCE, RHODE ISLAND.

ORNAMENTAL CHAIN.

SPECIFICATION forming part of Letters Patent No. 318,997, dated June 2, 1885.

Application filed December 1, 1884. (No model.)

*To all whom it may concern:*

Be it known that I, RUFUS S. MATTESON, of the city and county of Providence, in the State of Rhode Island, have invented a certain new and useful Improvement in Ornamental Chains; and I do hereby declare the following to be a specification thereof, reference being had to the accompanying drawings.

Like letters indicate like parts.

Figure 1:
Figure 2:
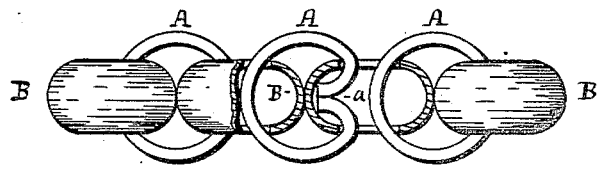
Figure 3:
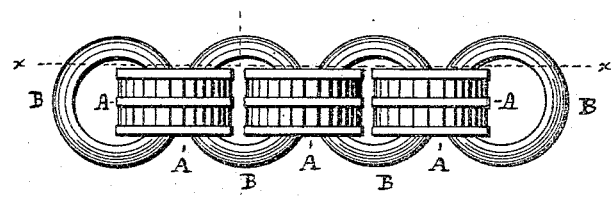

Figure 1 is a top plan of one link of my improved chain. Fig. 2 is a top view of the chain constructed of heart-shaped links in combination with concave bead-links, the same being shown partly in section along the line $x$ $x$ of Fig. 3. Fig. 3 is a side elevation of the chain so constructed.

My invention consists of an ornamental chain composed of links made of sheet stock cut in suitable strips and lengths and bent into a heart shape, the ends of which links enter into and engage with the interior concave surface of bead-links and form a chain, as hereinafter fully specified.

The link A is made of strips of sheet stock of solid or plated metal, and may be either ornamented, as shown in Fig. 3, or plain, as preferred. The stock, being cut into pieces of the desired length, is bent into the peculiar shape illustrated in Fig. 1, the ends $a$ being turned inwardly. This link A is used in combination with the bead-links B to form a chain. The bead-link B is made in the usual manner, and is concave on its interior surfaces, as appears in Fig. 2.

The chain is constructed of bead-links B, which are in line and contact, and are united by the links A, the ends $a$ of which are bent inwardly to enter and engage with the interior concave surfaces of the bead-links B.

Several important advantages are obtained by this construction. The inward bending of the ends $a$ gives a much greater strength to the links than if the ends are simply butted, as in an ordinary ring-link, and therefore it can sustain without injury a great longitudinal strain to which the chain may be subjected. A force sufficient to easily spread open the joint of an unsoldered ring will have no effect to injure my link, because such force would be received upon the ends $a$ in a direct line, and not laterally, as in the case of links of common construction.

The chain when united in the manner described has a remarkable strength by reason of the peculiar connection of the links. As fully shown in Fig. 2, the ends $a$ of the link A entering into the bead B are bent to fit into the concavity of the bead, and when so united cannot be spread apart, because prevented from such lateral displacement by the concave interior surface of the bead. The links A B are thus locked together firmly, while the flexibility of the chain is in nowise impaired.

It will be seen that this construction entirely dispenses with the use of solder, thereby saving labor, expense, and danger of loss.

The beads B are of course without seam, being punched and cupped in the usual manner. The links A, having their ends $a$ bent and lapped as hereinbefore described, are rendered strong enough by said construction to resist all strain without the use of solder, while the ends are wholly concealed within the concave portion of the bead-links B. As soldering is not required either for the appearance or strength of the link, I dispense with it entirely, but secure as good results. So, too, I am able to use a much lighter stock, because my chain is not subjected to heat in its manufacture, and thin plated stock may be used without marring or disfigurement, which would be unable to withstand the heat of the blow-pipe in soldering, as in chains of the usual construction.

It is evident that, instead of using flat strips of stock for the link A, I may as well use flat or round wire for the purpose.

I claim as a novel and useful invention and desire to secure by Letters Patent—

An ornamental chain composed of the links A of bent stock, having their ends $a$ $a$ turned inwardly, as shown, and the bead-links B, in whose concave interior surface said ends $a$ $a$ of the links A are engaged, substantially as specified.

RUFUS S. MATTESON.

Witnesses:
WM. B. W. HALLETT,
WARREN R. PERCE.